United States Patent [19]

Sakai

[11] Patent Number: 4,810,591
[45] Date of Patent: Mar. 7, 1989

[54] METAL GASKET

[75] Inventor: Yakichi Sakai, Hamamatsu, Japan

[73] Assignees: Hamamatsu Gasket Seisakusho Limited; Nippon Gakki Seizo Kabushiki Kaisha, both of Japan

[21] Appl. No.: 916,293

[22] Filed: Oct. 7, 1986

[30] Foreign Application Priority Data

Oct. 11, 1985 [JP] Japan ............................ 60-224777

[51] Int. Cl.4 ............................................ B32B 15/20
[52] U.S. Cl. ............................ 428/652; 277/235 B; 277/236; 428/653; 428/675; 428/677; 428/679
[58] Field of Search ............... 428/652, 653, 675, 677, 428/679; 277/235 B, 236

[56] References Cited

U.S. PATENT DOCUMENTS

| 2,711,334 | 6/1955 | Balfe | 277/235 B |
| 2,970,065 | 1/1961 | Greene et al. | 428/652 |
| 3,749,558 | 7/1973 | Dillenschneider | 428/679 |
| 4,279,968 | 7/1981 | Ruscoe et al. | 428/677 |
| 4,287,008 | 9/1981 | Torok et al. | 428/653 |
| 4,340,650 | 7/1982 | Pattanaik et al. | 428/677 |
| 4,579,761 | 4/1986 | Ruscoe et al. | 428/675 |

FOREIGN PATENT DOCUMENTS 94616 11/1983 European Pat. Off. ........ 277/235 B

OTHER PUBLICATIONS

*The Making, Shaping and Treating of Steel*, United States Steel, 1971, pp. 964, 1139 and 1239.
*Metals Handbook*, Ninth Edition, vol. 1, "Properties and Selection: Irons and Steels", American Society for Metals, 1978, pp. 128, 285-286.

Primary Examiner—L. Dewayne Rutledge
Assistant Examiner—Robert L. McDowell
Attorney, Agent, or Firm—Ostrolenk, Faber, Gerb & Soffen

[57] ABSTRACT

In construction of a composite type metal gasket having a hard metal substrate, use of Cu, Cu-base alloy, Al or Al-base alloys for covering layers well enhances sealing effect and consolidates substrate-covering bonding.

26 Claims, 3 Drawing Sheets

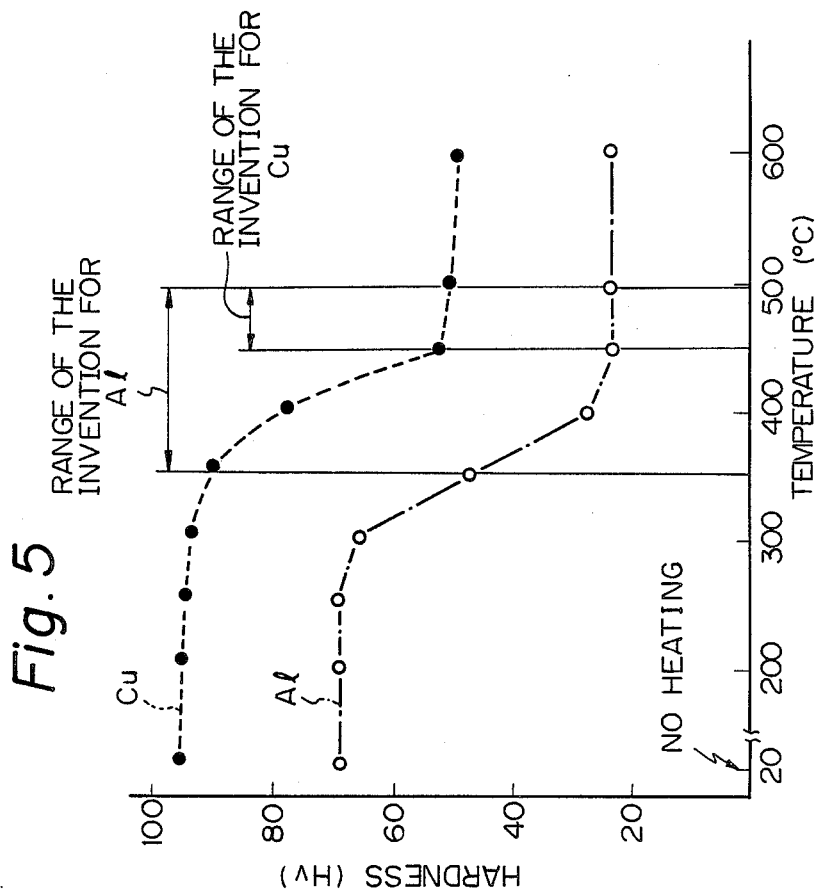

METAL GASKET

BACKGROUND OF THE INVENTION

The present invention relates to a metal gasket, and more particularly relates to an improvement of a composite metal gasket advantageously used for sealing of internal engines.

One conventional metal gasket of such a type is disclosed in Japanese Utility Model Opening Sho.59-152249. This metal gasket has a composite structure in which a substrate made of hard metal is covered with covering layers which are made of soft metal and clad to both surfaces of the substrate. During production of such a composite metal gasket, plastic deformation such as cladding and stamping causes hardening of the covering layers and, as a consequence, it is very difficult to obtain a uniform soft surface condition on the produced metal gasket. When such a metal gasket is employed in sealing, the metal gasket cannot assure sufficient sealing of the rough surface of the object being tested.

SUMMARY OF THE INVENTION

It is the object of the present invention to provide a composite type metal gasket which provides a satisfactory sealing function.

In accordance with the present invention both surfaces of a substrate made of hard metal are covered with covering layers which are applied thereto and made of Cu, Cu-base alloys, Al or Al-base alloys, these materials being heat treated during production at a temperature in a range from 350° to 500° C.

BRIEF DESCRIPTION OF THE DRAWINGS

FIG. 5 is a graph for showing the relationship between the hardness of the covering layer and the heating temperature at production.

DESCRIPTION OF THE PREFERRED EMBODIMENTS

Figure 1:
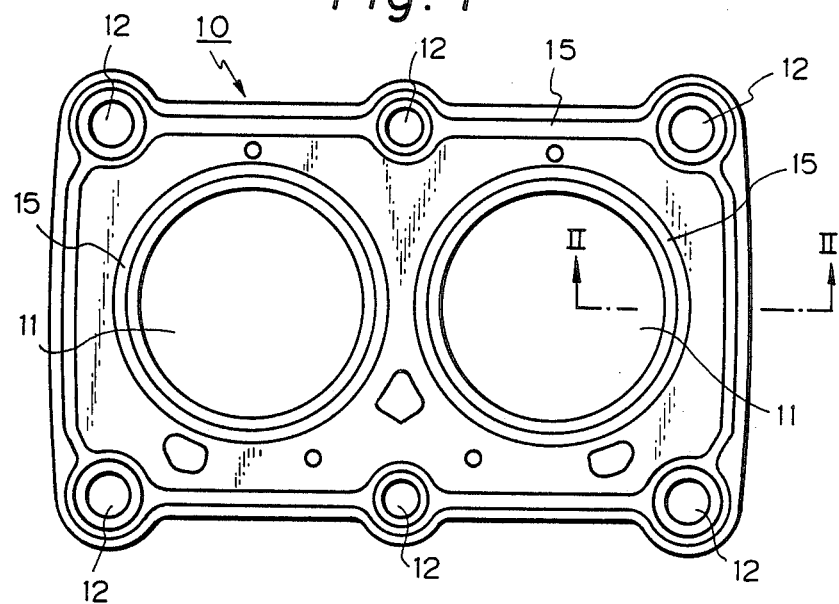
FIG. 1 is a plan view of one embodiment of the metal gasket in accordance with the present invention.
Figure 2:
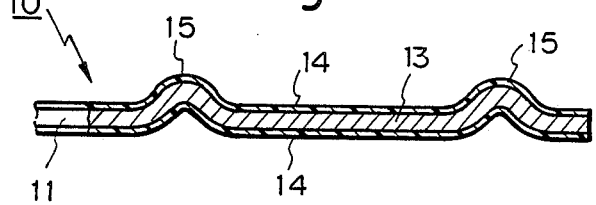
FIG. 2 is a section taken along a line II—II in FIG. 1.

In FIG. 1, a metal gasket 10 is provided with, for example, cylinder holes 11 and bolt holes 12 and is interposed between contact faces of a cylinder block and a cylinder head (not shown). In a typical example, the metal gasket 10 is made up of a substrate 13 made of stainless steel and covering layers 14 clad to both surfaces of the substrate 13. The covering layers 14 are made of Cu, Cu-base alloys, Al or Al-base alloys.

Around the cylinder and bolt holes 11 and 12, the metal gasket 10 is provided with elongated beads 15. During production, the metal gasket 10 is heat treated after formation of the beads at a temperature in a range from 350° to 500° C. Preferably, the metal gasket is heat treated at a temperature preferably in a range from 450° to 500° C. when it is made of Cu or Cu-base alloys. Whereas the metal gasket is heat treated at a temperature preferably in a range from 350° to 500° C. when it is made of Al or Al-base alloys.

Generally, the substrate 13 is made of hard metal such as stainless steel, and more preferably heat resistant spring metal. One example of such heat resistant spring metal is cold rolled spring steel which includes 0.4 to 1.0% by weight of C, 0.1 to 0.5% by weight of Si and Fe in balance. When necessary, one or more of 1.0% by weight or less of Mn, 1.5% by weight or less of Cr and 0.5% by weight or less of V may be selectively included too. Another example of such spring metal is spring stainless steel which includes 10 to 20% by weight of Cr and Fe in balance. When necessary, one or more of 0.5% by weight or less of C, 1.0% by weight or less of Si, 2.0% by weight or less of Mn, 12% by weight or less of Ni and 2.0% by weight or less of Al may be included too. Another example of such spring metal is heat resistant spring steel which includes 30 to 46% by weight of Ni, 15 to 25% by weight of Cr and Fe in balance. When necessary, one or more of 0.1% by weight or less of C, 1.0% by weight or less of Si, 1.5% by weight or less of Mn, 5.0% by weight or less of Mo, 3.0% by weight or less of Cu, 1.0% by weight or less of Al and 1.5% by weight or less of Ti may be included too. A further example of such spring metal is heat resistant Ni-base spring alloy which includes 10 to 25% by weight of Cr and Ni in balance. When necessary, it may further include one or more of 30% by weight or less of Fe, 0.2% by weight or less of C, 1.0% by weight or less of Si, 1.0% by weight or less of Mn, 1.0% by weight or less of Cu, 2.0% by weight or less of Al, 3.0% by weight or less of Ti and 1.5% by weight or less of (Nb+Ta).

The production process is adjusted so that the ultimate thickness of the substrate should preferably be in a range from 0.10 to 0.35 mm and the ultimate hardness should preferably be Hv 350 to 500.

The covering layer 14 is made of Cu, Cu-base alloys, Al and Al-base alloys. One Cu type example includes one or more of 3.5% by weight or less of Fe, 3.0% by weight or less of Sn, 45% by weight or less of Zn, 12% by weight or less of Al, 2.0% by weight or less of Mn, 35% by weight or less of Ni and 0.5% by weight or less of P, and Cu in balance. One Al type example includes one or more of 1.2% by weight or less of Si, 1.0% by weight or less of Fe, 5.0% by weight or less of Cu, 1.5% by weight or less of Mn, 5.0% by weight or less of Mg, 0.5% by weight or less of Cr, 5.0% by weight or less of Zn, 0.5% by weight or less of Ti, 0.5% by weight or less of V and 0.5% by weight or less of Zr, and Al in balance.

The metal gasket 10 in accordance with the present invention may further include intermediate layers formed between the substrate 13 and the covering layers 14. One intermediate layer is made of Ni when Cu or Cu-base alloys is used for the covering layer, and made of Cu when Al or Al-base alloys is used for the covering layer.

The intermediate layer may be formed on the substrate by, for example, plating or cladding. The presence of such intermediate layers effectively prevents a fragile intermetallic compound from being developed between the substrate and the covering layers and prevents generation of voids during the heating process and helps consolidate bonding between the substrate and the covering layers.

The production process is adjusted so that the ultimate thickness of the covering layer should preferably be in a range from 0.03 to 0.15 mm and the ultimate hardness should preferably be HV60 or less.

Figure 3:
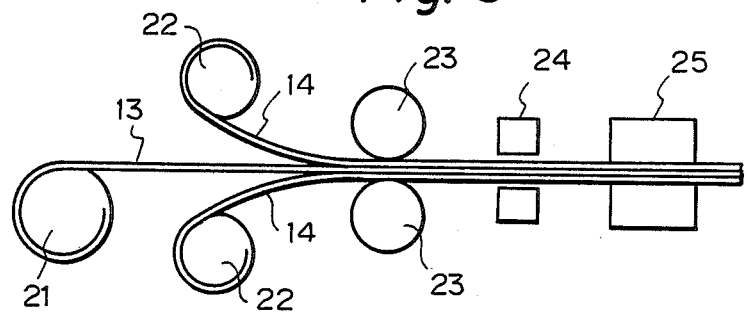
FIG. 3 is a simplified side view of one example of the production process of the metal gasket in accordance with the present invention.

One example of the production process is shown in FIG. 3, in which a crude substrate 13 is taken from a sheet roll 21 and crude covering layers 14 are taken from sheet layers 22 in a manner to sandwich the crude substrate 13. The crude sandwich combination is clad by a pair of press rollers 23. After cladding, plastic deformation is applied at a presser 24 in order to form the above-described cylinder holes, bolt holes and elongated beads. Next the deformed combination is passed to a heater 25 for heat treatment.

Figure 4:
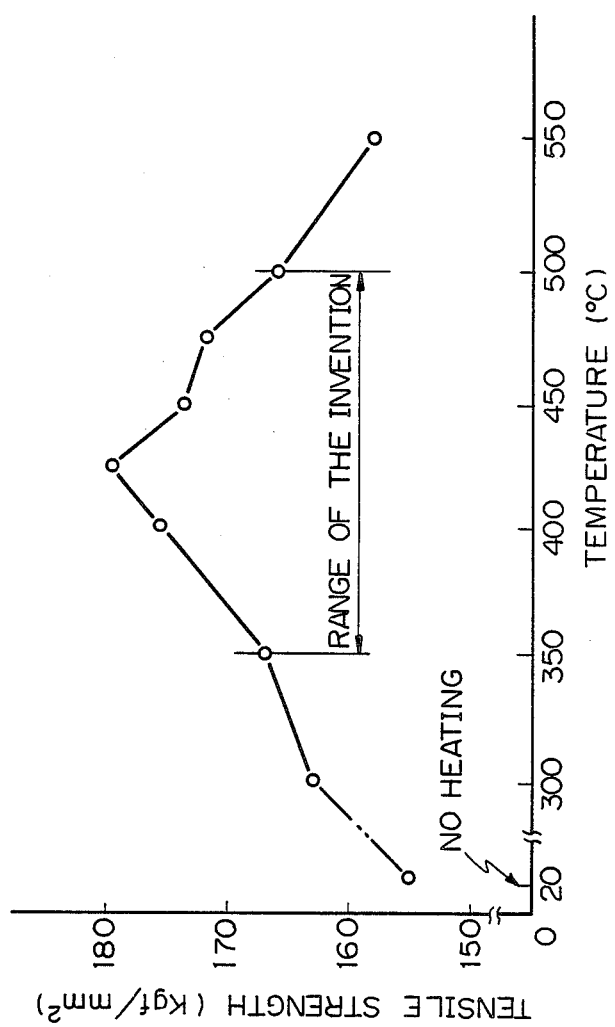
FIG. 4 is a graph for showing the relationship between the tensile strength of the substrate and the heating temperature at production.

In order to confirm the effect of the present invention on the tensile strength, a series of tests were conducted at various heating temperatures using a substrate of 0.2 mm thickness and made of SUS301H. Heating at each temperature was continued for 30 min. Thereafter, the tensile strength of the substrate was measured and the results are plotted in FIG. 4, in which the heating temperature is taken on the abscissa and the tensile strength is taken on the ordinate. The graphical representation well indicates that the heating temperature range employed in the present invention assures significant rise in the tensile strength.

Further a series of different tests were conducted in order to confirm the effect of the present invention on the hardness. In FIG. 5, the heating temperature is taken on the abscissa, the hardness is taken on the ordinate, the dotted line is for a Cu covering layer and the chain line is for an Al covering layer. It is clearly seen in the graph that the heating temperature employed in the present invention assures subdued hardening of the covering layers at heating.

I claim:

1. A metal gasket comprising:
a substrate made of heat resistant spring metal having a hardness of Hv 350 to 500; and
covering layers clad to said substrate and covering both surfaces of said substrate and made of a material chosen from a group consisting of Cu, Cu-base alloys, Al and Al-base alloys, said covering layers and said substrate being heat treated during production of said gasket at a temperature in a range from 350° to 500° C.

2. A metal gasket as claimed in claim 1 in which
said covering layers are made of one of Cu and Cu-base alloy, and
heat treatment is carried out at a temperature in a range from 450° to 500° C.

3. A metal gasket as claimed in claim 1 in which
said heat resistant spring metal is cold rolled spring steel which includes 0.4 to 1.0% by weight of C, 0.1 to 0.5% by weight of Si and Fe in balance.

4. A metal gasket as claimed in claim 3 in which
said cold rolled spring steel further includes one or more of 1.0% by weight or less of Mn, 1.5% by weight or less of Cr and 0.5% by weight or less of V.

5. A metal gasket as claimed in claim 1 in which
said heat resistant spring metal is spring stainless steel which includes 10 to 20% by weight of Cr and Fe in balance.

6. A metal gasket as claimed in claim 5 in which
said spring stainless steel further includes one or more of 0.5% by weight or less of C, 1.0% by weight or less of Si, 2.0% by weight or less of Mn, 12% by weight or less of Ni and 2.0% by weight or less of Al.

7. A metal gasket as claimed in claim 1 in which
said heat resistant spring metal is heat resistant spring steel which includes 30 to 46% by weight of Ni, 15 to 25% by weight of Cr and Fe in balance.

8. A metal gasket as claimed in claim 7 in which
said heat resistant spring steel further includes one or more of 0.1% by weight or less of C, 1.0% by weight or less of Si, 1.5% by weight or less of Mn, 5.0% by weight or less of Mo, 3.0% by weight or less of Cu, 1.0% by weight or less of Al and 1.5% by weight or less of Ti.

9. A metal gasket as claimed in claim 1 in which
said heat resistant spring metal is heat resistant Ni-base spring alloy which includes 10 to 25% by weight of Cr and Ni in balance.

10. A metal gasket as claimed in claim 9 in which
said heat resistant Ni-base spring alloy further includes one or more of 30% by weight of Fe, 0.2% by weight of C, 1.0% by weight or less of Si, 1.0% by weight or less of Mn, 1.0% by weight or less of Cu, 2.0% by weight or less of Al, 3.0% by weight or less of Ti and 1.5% by weight or less of (Nb+Ta).

11. A metal gasket as claimed in claim 1 in which
said covering layers are made of Cu-base alloy which includes one or more of 3.5% by weight or less of Fe, 3.0% by weight or less of Sn, 45% by weight or less of Zn, 12% by weight or less of Al, 2.0% by weight or less of Mn, 35% by weight or less of Ni and 0.5% by weight or less of P, and Cu in balance.

12. A metal gasket is claimed in claim 1 in which
said covering layers are made of Al-base alloy which includes one or more of 1.2% by weight or less of Si, 1.0% by weight or less Fe, 5.0% by weight or less of Cu, 1.5% by weight or less of Mn, 5.0% by weight or less of Mg, 0.5% by weight or less of Cr, 5.0% by weight or less of Zn, 0.5% by weight or less of Ti, 0.5% by weight or less of V and 0.5% by weight or less of Zr, and Al in balance.

13. A metal gasket as claimed in claim 1 further comprising
intermediate layers formed between said substrate and said covering layers.

14. A metal gasket as claimed in claim 13 in which
said covering layers are made of one of Cu and Cu-base alloys, and
said intermediate layers are made of Ni.

15. A metal gasket as claimed in claim 13 in which
said covering layers are made of one of Al and Al alloys, and
said intermediate layers are made of Cu.

16. A metal gasket as claimed in claim 1 in which
the thickness of said substrate is in a range from 0.10 to 0.35 mm.

17. A metal gasket as claimed in claim 1 in which
the thickness of each said covering layer is in a range from 0.03 to 0.15 mm.

18. A metal gasket comprising:
a substrate made of cold rolled spring steel which includes 0.4 to 1.0% by weight of C, 0.1 to 0.5% by weight of Si and Fe in balance; and
covering layers clad to said substrate and covering both surfaces of said substrate and made of alloys chosen from a group consisting of Cu, Cu-base alloys, Al and Al-base alloys, said covering layers and said substrate being heat treated during production of said gasket at a temperature in a range of 350° to 500° C.

19. A metal gasket as claimed in claim 18 in which said cold rolled spring steel further includes one or more of 1.0% by weight or less of Mn, 1.5% by weight or less of Cr and 0.5% by weight or less of V.

20. A metal gasket comprising:
a substrate made of spring stainless steel which includes 10 to 20% by weight of Cr and Fe in balance; and
covering layers clad to said substrate and covering both surfaces of said substrate and made of alloys chosen from a group consisting of Cu, Cu-base alloys, Al and Al-base alloys, said covering layers and said substrate being heat treated during production of said gasket at a temperature in a range of 350° to 500° C.

21. A metal gasket as claimed in claimed in claim 20 in which said spring stainless steel further includes one or more of 0.5% by weight or less of C, 1.0% by weight or less of Si, 2.0% by weight or less of Mn, 12% by weight or less of Ni and 2.0% by weight or loss of Al.

22. A metal gasket comprising:
a substrate made of heat resistant spring steel which includes 30 to 46 by weight of Ni, 15 to 25% by weight of Cr and Fe in balance; and
covering layers clad to said substrate and covering both surfaces of said substrate and made of alloys chosen from a group consisting of Cu, Cu-base alloys, Al and Al-base alloys, said covering layers and said substrate being heat treated during production of said gasket at a temperature in a range of 350° to 500° C.

23. A metal gasket as claimed in claim 22, in which said heat resistance spring steel further includes one or more of 0.1% by weight or less of C, 1.0% by weight or less of Si, 1.5% by weight or less of Mn, 5.0% by weight or less of Mo, 3.0% by weight or less of Cu, 1.0% by weight or less of Al and 1.5% by weight or less of Ti.

24. A metal gasket comprising:
a substrate made of heat resistant Ni-base spring alloy which includes 20 to 25% by weight of Cr and Ni in balance; and
covering layers clad to said substrate and covering both surfaces of said substrate and made of alloys chosen from a group consisting of Cu, Cu-base alloys, Al and Al-base alloys, said covering layers and said substrate being heat treated during production of said gasket at a temperature in a range of 350° to 500° C.

25. A metal gasket as claimed in claim 24, in which said heat a resistant Ni-base spring alloy further includes one or more of 30% by weight of Fe, 0.2% by weight of C, 1.0% by weight or less of Si, 1.0% by weight or less of Mn, 1.0% by weight or less of Cu, 2.0% by weight or less of Al, 3.0% by weight or less of Ti and 1.5% by weight or less of (Nb+Ta).

26. A metal gasket comprising:
a substrate made of metal;
covering layers clad to said substrate and covering both surfaces of said substrate and made of a material chosen from a group consisting of Al and Al-base alloys, said covering layers and said substrate being heat treated during production of said gasket, at a temperature in a range of from 350° to 500° C.; and
intermediate layers formed between said substrate and said covering layers, said intermediate layers being made of Cu.

* * * * *